US010220423B2

(12) United States Patent
Starr et al.

(10) Patent No.: US 10,220,423 B2
(45) Date of Patent: Mar. 5, 2019

(54) MOBILE JETTER AND PIPE INSPECTION ROBOT

(71) Applicant: RedZone Robotics, Inc., Pittsburgh, PA (US)

(72) Inventors: Justin Starr, Baden, PA (US); Galin Konakchiev, Pittsburgh, PA (US); Jordan Himes, Pittsburgh, PA (US); Charles Pulaski, Allison Park, PA (US)

(73) Assignee: RedZone Robotics, Inc., Pittsburgh, PA (US)

( * ) Notice: Subject to any disclaimer, the term of this patent is extended or adjusted under 35 U.S.C. 154(b) by 175 days.

(21) Appl. No.: 15/278,974

(22) Filed: Sep. 28, 2016

(65) Prior Publication Data

US 2018/0085798 A1   Mar. 29, 2018

(51) Int. Cl.
*B08B 9/049* (2006.01)
*F16L 55/32* (2006.01)
*G01S 15/88* (2006.01)
*F16L 101/30* (2006.01)
*F16L 101/12* (2006.01)

(52) U.S. Cl.
CPC ............. *B08B 9/049* (2013.01); *F16L 55/32* (2013.01); *F16L 2101/12* (2013.01); *F16L 2101/30* (2013.01); *G01S 15/88* (2013.01); *Y02A 90/36* (2018.01); *Y10S 901/44* (2013.01)

(58) Field of Classification Search
CPC ........... B08B 9/00; B08B 9/027; B08B 9/043; B08B 9/0433; B08B 9/0436; B08B 9/045; B08B 9/047; B08B 9/049; B08B 9/0492; B08B 9/051; B08B 2209/04; B08B 9/053; B08B 9/0535; F16L 55/32; F16L 2101/00; F16L 2101/10; F16L 2101/12; F16L 2101/20; F16L 2101/30; E04H 4/1654; E03F 9/00; E03F 9/002; E03F 9/005; E03F 9/007
See application file for complete search history.

(56) References Cited

U.S. PATENT DOCUMENTS

| 5,561,883 | A  | * | 10/1996 | Landry | B08B 9/051 15/302 |
| 6,325,305 | B1 | * | 12/2001 | Kuhlman | E21B 37/00 166/222 |
| 7,993,469 | B1 | * | 8/2011 | Vallapuzha | B08B 9/04 134/18 |
| 2012/0197440 | A1 | | 8/2012 | Farkavec | |
| 2013/0092193 | A1 | * | 4/2013 | Porat | B08B 9/093 134/22.1 |
| 2015/0196182 | A1 | * | 7/2015 | Hekman | A47L 7/0033 134/10 |

FOREIGN PATENT DOCUMENTS

RU    133896 U1   10/2013

OTHER PUBLICATIONS

Vladimirova, T., International Search Report and Written Opinion of the International Searching Authority, PCT/US2017/053703, (dated Dec. 21, 2017), 9 pages.

* cited by examiner

*Primary Examiner* — David G Cormier
(74) *Attorney, Agent, or Firm* — Cafardi, Ferguson, Wyrick, Weis + Stotler LLC; Andrew M. Gabriel

(57) ABSTRACT

One embodiment provides an apparatus, including: a pipe inspection robot that traverses a pipe; a fetter comprising a water pump; and an intake hose that couples the pump of the jetter to a local water source proximate to the pipe inspection robot. Other aspects are described and claimed.

13 Claims, 3 Drawing Sheets

MOBILE JETTER AND PIPE INSPECTION ROBOT

BACKGROUND

Pipes that carry water, other fluids and gases are an important type of infrastructure. Pipes are often inspected as a matter of routine upkeep or in response to a noticed issue. Pipes are also cleaned, e.g., using water jetting, to clear debris out of the pipes and return it to a natural flow (e.g., treatment plant) or remove it (e.g., using a vacuum truck).

Conventionally pipes are inspected and jetted separately. For example, a pipe may first be cleaned by water jetting and is thereafter inspected. Further, the equipment used for jetting a pipe is conventionally totally separate from the inspection equipment. A typical water fetter is provided as a separate unit, e.g., on a skid or within a vehicle such as a truck or van. The water jetter draws water from a dedicated source, e.g., a water tank, a natural flow (e.g., stream or lake), pressurizes the water (using an engine driven pump), provides water on a pressurized line or hose to a nozzle, and directs the pressurized water into areas of the pipe using a terminal nozzle system.

BRIEF SUMMARY

In summary, one aspect provides an apparatus, comprising: a pipe inspection robot that traverses a pipe; a jetter comprising a water pump; and an intake hose that couples the pump of the jetter to a local water source proximate to the pipe inspection robot.

Another aspect provides a pipe inspection robot, comprising: a powered track system providing movement through a pipe to the pipe inspection robot; a jetter comprising a water pump; and an intake hose that couples the pump of the jetter to a local water source proximate to the track system.

A further aspect provides an apparatus, comprising: a pipe inspection robot, comprising: a means for movement through a pipe; a jetter comprising a water pump; and a sensor component including a processor; said processor configured to: operate the sensor component to collect pipe inspection data related to a pipe interior; and communicate the pipe inspection data collected over a network connection.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "embodiment(s)" (or the like) means that a particular feature, structure, or characteristic described in connection with the embodiment is included in at least one embodiment. Thus, appearances of the phrases "according to embodiments" or "an embodiment" (or the like) in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

Water jetters (of various types) are often used to clean small and medium diameter pipelines. Water jetters work by spraying a jet of compressed water at debris or deposits in order to dislodge them and enable them to be removed via natural scouring or a vacuum truck. Typically these water jetters use external sources of water or water tanks, with a pump mounted on the top side.

An embodiment provides an integrated, submersible pump, filter and one or more (e.g., an array of) jetter nozzle(s) on a mobile platform, e.g., a pipe inspection robot, in order to clear debris using the mobile platform, e.g., while or in connection with performing a pipe inspection mission. An embodiment may use pressurized water to increase mobility of the robot or to clean pipelines without wasting freshwater or increasing the flow to treatment plants.

The description now turns to the figures. The illustrated example embodiments will be best understood by reference to the figures. The following description is intended only by way of example, and simply illustrates certain example embodiments.

Figure 1:
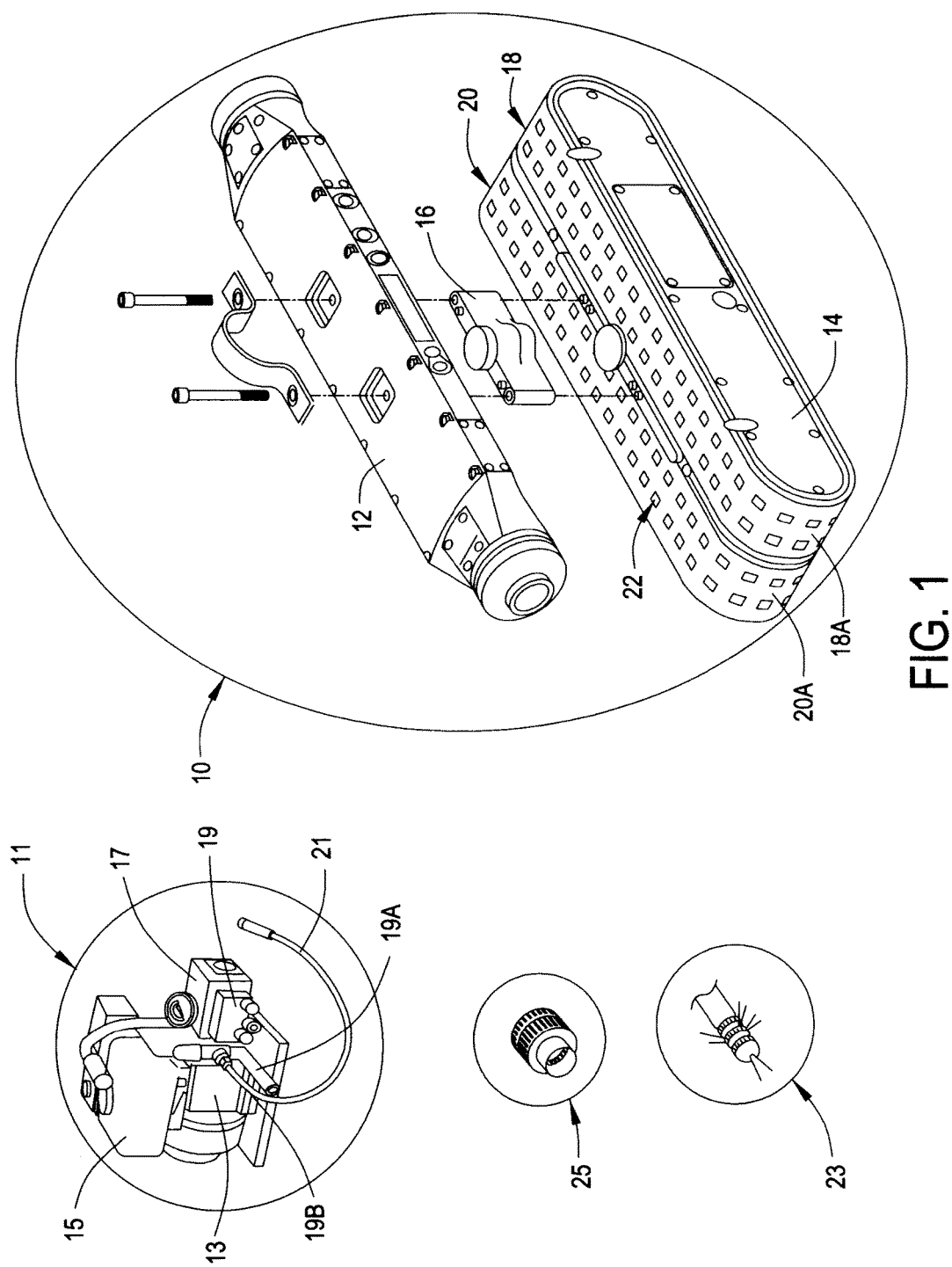
FIG. 1 illustrates an example pipe inspection robot.

FIG. 1 illustrates an example pipe inspection robot 10 that may be utilized for capturing pipe inspection data and for jetting the pipe. For purposes of clarity, a partially exploded view of the pipe inspection robot 10 is shown in FIG. 1. As explained in more detail hereinafter, the device may be utilized to navigate, explore, map, clean, etc., various environments (e.g., water pipes, sewer pipes, etc.). In an embodiment, the pipe inspection robot 10 may be implemented as an autonomous mobile robot 10 utilized for pipe (e.g., a sewer pipe) inspection and/or jetting operations. However, it will be appreciated that the pipe inspection robot 10 may be embodied in any number of different types of inspection platforms, including non-autonomous devices and platforms, and may be utilized in a plurality of other environments.

The autonomous mobile robot 10 used by way of example for descriptive purposes includes a sensor component 12 and a chassis portion 14. The sensor component 12 is electrically and mechanically connected to the chassis portion 14. As shown in FIG. 1, the autonomous mobile robot 10 may also include a riser portion 16 which is positioned between the sensor component 12 and the chassis portion 14, and is electrically and mechanically connected to each. The riser portion 16 operates to increase the distance the sensor component 12 is situated above the lowest portion of the pipe, and may be utilized in large pipe applications to provide a desired vantage point for various sensing devices of the sensor component 12. Additionally, riser portion 16 and sensor component 12 are modular, i.e., they may be coupled/decoupled to and from the autonomous mobile robot 10. For example, according to other embodiments, the autonomous mobile robot 10 does not include the above-described riser portion 16 but rather includes a jetter 11. In another embodiment, both sensor portion 12 and jetter 11 are included, with or without the riser 16. The order (stacking) of modules such as the sensor portion 12, the jetter 11, and/or riser 16 may be selected according to a number of factors, e.g., the type of jetter 11 (e.g., nozzle configuration), the type of sensor portion (e.g., 360 imaging, partial view, forward looking, etc.) and the environment to be inspected and/or cleaned.

Functionality of the autonomous mobile robot 10 may be implemented by a computing device and/or a computer program stored on a computer-readable medium, as further described herein.

According to an embodiment, the sensor component 12 includes a plurality of sensing devices (e.g., a camera, a radar device, a sonar device, an infrared device, a laser device, etc.) for sensing (e.g., imaging) the conditions within the environment, a computing device communicably connected to the sensing devices and having a processor for processing raw information captured by the sensing devices, a memory device communicably connected to a computing device for storing the raw and/or processed information, and control circuitry communicably connected to the computing device for controlling various components of the autonomous mobile robot 10. The memory device may also be utilized to store software which is utilized by the autonomous mobile robot 10 to navigate, explore, map, jet, etc., the environment.

As further shown in FIG. 1, the chassis portion 14 includes a first track 18, and a second track 20. In an embodiment, the first track 18 is identical to the second track 20. The first and second tracks 18, 20 may be fabricated from any suitable material or combination of materials. The first and second tracks 18, 20 each define a plurality of openings 22 there-through. The openings 22 may be of any suitable shape and size, and may be arranged in any suitable configuration. Although only two rows of the openings 22 are shown in FIG. 1 for each track, it is understood that the openings 22 may be arranged in any number of rows. The first track 18 is positioned adjacent the second track 20. Collectively, the first and second tracks 18, 20 define a spacing there-between, and cover substantially the entire width of the chassis portion 14. For example, according to an embodiment, the width of the chassis portion is approximately 100 millimeters, and the first and second tracks 18, 20 collectively cover approximately 92 of the 100 millimeters.

The first track 18 defines a first surface 18a and a second surface (not shown in FIG. 1) opposite the first surface 18a. According an embodiment, the first surface 18a is the surface which comes in contact with an interior surface of a pipe when the autonomous mobile robot 10 is being utilized for a pipe application. The first surface 18a of the first track 18 is substantially smooth. Similarly, the second track 20 defines a first surface 20a and a second surface (not shown in FIG. 1) opposite the first surface 20a. The first surface 20a is the surface which comes in contact with an interior surface of a pipe when the autonomous mobile robot 10 is being utilized for a pipe application. Again, the first surface 20a of the first track 20 may be substantially smooth. The respective first surfaces 18a, 20a of the first and second tracks 18, 20 have a relatively high static coefficient of friction.

The first and second tracks 18, 20 may be referred to as full coverage/wide tracks. Due to the collective width of the first and second tracks 18, 20 relative to the width of the chassis portion 14, the first and second tracks 18, 20 collectively form nearly the entire "front," "bottom" and "rear" surfaces of the chassis portion 14. Thus, when the autonomous mobile robot 10 encounters any debris or feature within the sewer pipe, the first surfaces 18a, 20a of the first and second tracks 18, 20 come in contact with the debris or feature. In contrast to wheeled robots and narrow track robots, the full coverage/wide tracks 18, 20 are configured to enable the autonomous mobile robot 10 to climb over the debris or feature and continue performing the inspection, navigation, mapping, etc. Additionally, nearly all of the weight of the autonomous mobile robot 10 passes through the moving full coverage/wide tracks 18, 20 to the encountered debris or feature. Therefore, the autonomous mobile robot 10 is configured to always continue driving as the full coverage tracks 18, 20 cannot rotate without contacting something to react with and continue driving.

In an embodiment, in addition to in lieu of sensor component 12, a jetter 11 may be included. The jetter 11 includes components to provide a pressurized stream of water through a nozzle or nozzles 23. For example, the jetter 11 may include an engine 13 that supplies the mechanical force to pressurize a pump 17. The engine 13 may be of various types, for example a gasoline or other internal combustion engine that runs on fuel, as for example provided by fuel tank 15.

The pump 17 may provide pressurized water from a local source, e.g., water taken up from the pipe interior at a lower margin of the autonomous mobile robot 10. By way of example, an inlet hose 21 may extend behind the autonomous mobile robot 10 to a lower margin of the autonomous mobile robot 10 and suction water up from the pipe's bottom into a manifold 19 of the pump. The end of the hose 21 may be provided with a filter 25, e.g., a cage type filter, or other mechanism to prevent debris from the pipe water from entering the intake 19b of the manifold 19.

The engine 13 pressurizes the water obtained via the intake 19b and provides it through the outflow 19a to a connected nozzle 23. The nozzle 23 may be directly connected to outflow 19a or may be coupled to the outflow 19a by a hose or tubing (not shown). Various nozzle types may be provided, e.g., a penetrating nozzle may be provided for initial penetration of the pipe or a closed nozzle may be used for cleaning. In an embodiment, more than one type of nozzle 23 may be coupled to outflow 19a, e.g., one penetrating and one closed nozzle.

Furthermore, in an embodiment various components may be interchanged in order to accomplish different tasks. For example, if cleaning is the only mission or is a priority mission, the jetter 11 may be included in place of the sensor component 12. Likewise, the chassis portion 14 may be varied depending on the mission type. For example, rather than a chassis portion 14 having tracks 18, 20, an embodiment may be fitted with a platform chassis, e.g., a floating platform.

An embodiment may utilize the nozzle(s) 23 for various purposes. For example, a penetrating nozzle may be chosen for cleaning in a forward (penetrating direction). This may be useful for example in an application where debris is to be cleared ahead of the autonomous mobile robot 10. In another example, the nozzle 23 may be a closed type nozzle in order to facilitate cleaning in a reverse direction, e.g., after an inspection mission in the forward direction has taken place. As will be readily apparent to those having skill in the art, the type and placement of nozzle(s) 23 may permit the pressurized water to provide a moving force for the autonomous mobile robot 10, e.g., in an implementation where the chassis portion 14 having tracks 18, 20 is replaced by another type of chassis (e.g., sled, floating platform, etc.).

Figure 2:
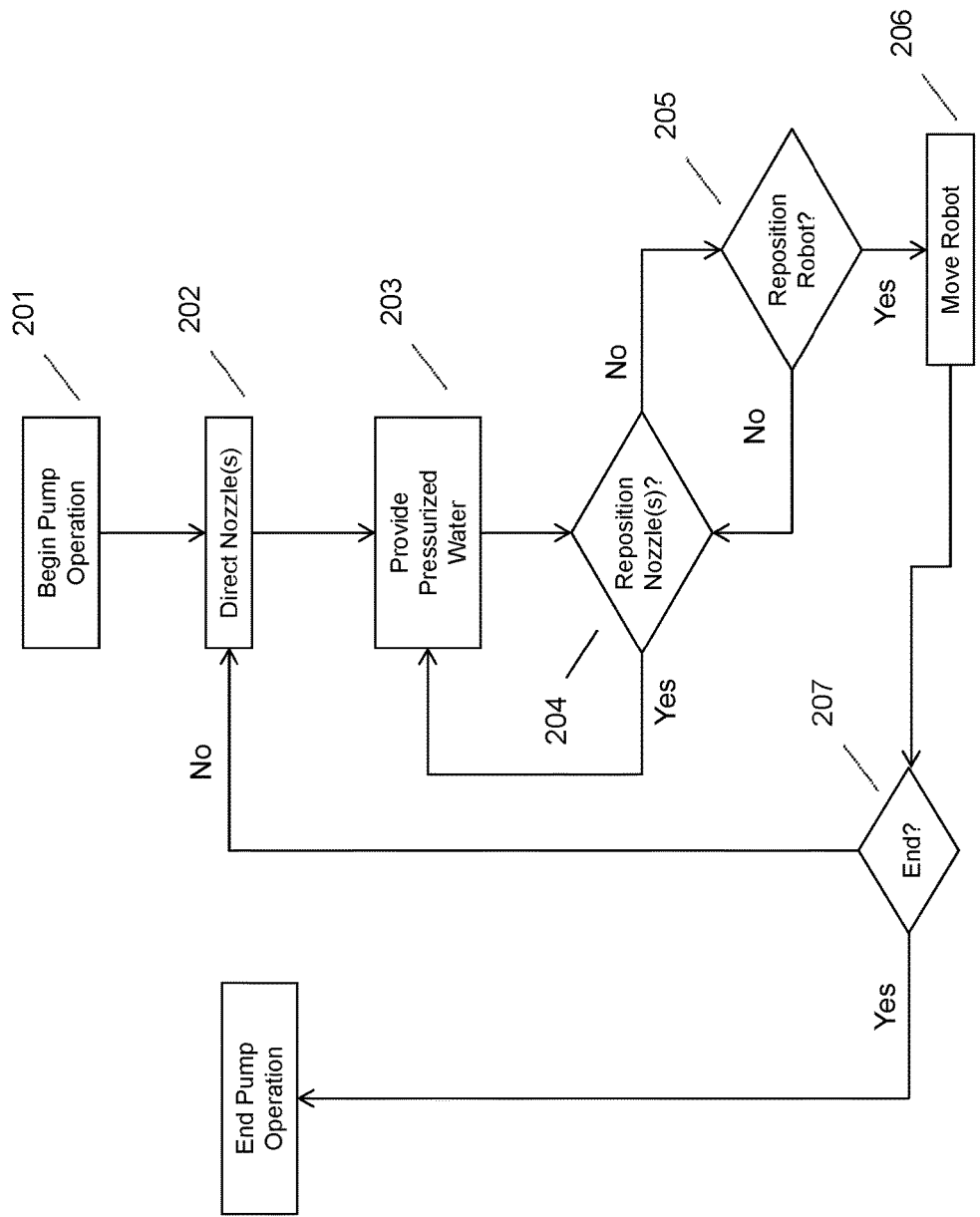
FIG. 2 illustrates an example method of using a pipe inspection robot for cleaning and/or inspecting a pipe.

Referring now to FIG. 2, at 201 an embodiment may operate a pump to pressurize water obtained locally, as described herein. If the autonomous mobile robot 10 includes nozzles that may be repositioned, e.g., at a target area of a wall of a pipe segment, an embodiment may direct the nozzle(s) at the target at 202. This permits the provision of pressurized water at 203 to be directed at a specific area within the pipe.

At 204 a determination may be made as to whether the nozzle(s) need to be redirected, e.g., at a new area of the pipe wall. This determination may be made autonomously, e.g., using image analysis of the pipe interior from images obtained for example by the sensor component. The redirection may also be provided autonomously according to a predetermined set of instructions or a program, e.g., a nozzle may be redirected according to a programmed routine as the autonomous mobile robot 10 makes its way through a pipe segment. Alternatively or in addition, an operator may instruct the autonomous mobile robot 10 to redirect the nozzle(s), e.g., using imaging provided in near real time by the sensor component 12.

If the nozzle(s) are not to be redirected, as determined at 204, the autonomous mobile robot 10 may continue to traverse down the pipe segment to jet a new area. At 205, for example, an embodiment may determine that the autonomous mobile robot 10 is to be repositioned, e.g., according to a preplanned cleaning and inspection mission routine, in response to an operator's instructions, etc. Thus, the autonomous mobile robot 10 may move at 206 to encounter a new section of the pipe. The steps, in various order, may be repeated, and one example is shown in FIG. 2. If the cleaning and inspection mission has ended as determined at 207, e.g., the autonomous mobile robot 10 has reached the end of particular pipe segment, the pump may be shut down, as indicated.

In an embodiment, the cleaning process may take place in combination with an inspection process. For example, a cleaning process may be carried out first, followed by an inspection process, whereby the autonomous mobile robot 10 traverses the pipe segment again, after the cleaning process, to capture visual or other imaging data. The reverse order is also possible. The cleaning process may be combined with the inspection process in other ways as well. By way of example, a cleaning process may be undertaken for a first part of a pipe segment, followed by an inspection process, and so on, until an entire segment length of the pipe has been inspected. Alternatively, inspection may be carried out simultaneously or substantially simultaneously with a cleaning process.

Furthermore, as has been noted herein, an embodiment may combine the inspection process with the cleaning process such that the cleaning process is directed by the result of an inspection process. For example, pump operation may begin at 201 responsive to detecting a particular debris location within the pipe during an inspection process. This permits an embodiment to conserve water and power such that only necessary cleaning is undertaken.

For example, in an embodiment, sonar or other imaging sensor may be coupled with the jetting, enabling an operator to track the progress of a cleaning operation as it takes place. For example, a pipe inspection robot that includes a sonar unit may conduct sonar sweeps that show how much debris is being removed. This imaging technique may be utilized to monitor or evaluate the process of cleaning in addition to using a technique to initialize the cleaning.

An embodiment includes a device or mechanism for debris removal, such as a filter or bucket positioned behind the robot that catches debris, e.g., allowing debris to be removed (e.g., pulled to the surface through an access point). Such a device or mechanism, e.g., a bucket or filter, may return to the robot remotely for an extended duration cleaning operation.

Furthermore, while an example autonomous mobile inspection robot has been described and illustrated in connection with FIG. 1, this is a non-limiting example. Other components or techniques may be utilized. For example, the hose 21 may be connected to a dedicated water tank or source and tethered/attached to the jetter 11 for certain applications instead of drawing water from a local source.

Figure 3:
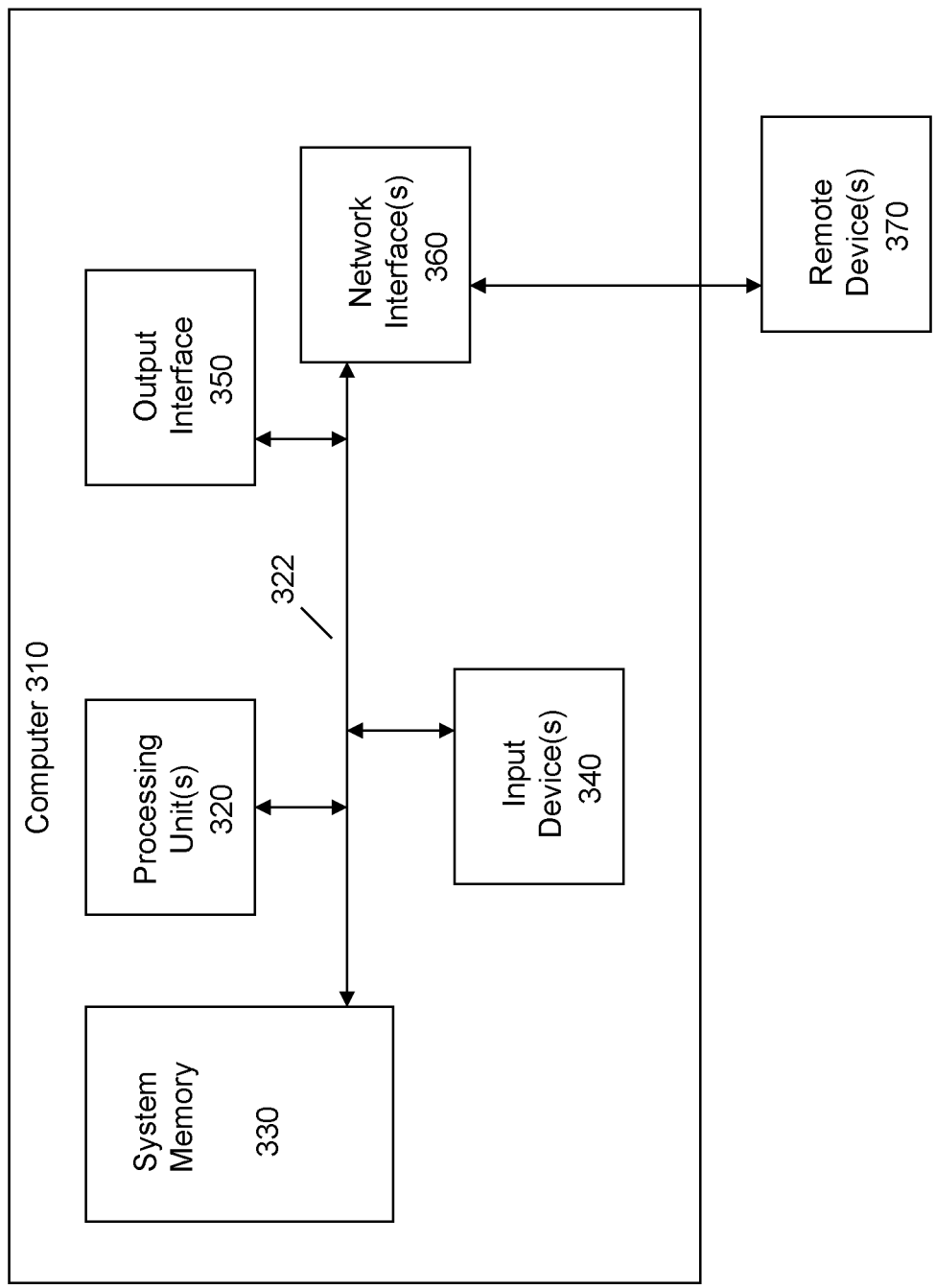
FIG. 3 illustrates an example of device electronics in the form of a computer.

It will be readily understood that certain embodiments can be implemented using any of a wide variety of devices, combinations of devices, and components. Referring to FIG. 3, an example device that may be used in implementing one or more embodiments includes a computing device (computer) 310. In this regard, a computing device 310 may be operatively coupled to autonomous mobile robot 10 and provide hosted services (data storage, data analysis, data summary and querying, and the like). For example, computing device 310 may provide network based access to autonomous mobile robot 10 for reporting inspection data, receiving data such as autonomous mission protocols, etc. Additionally or alternatively, autonomous mobile robot 10 may incorporate a computing device such as outlined in FIG. 3, e.g., included on board in sensor component 12.

The computing device 310 may execute program instructions configured to store an analyze pipe segment data and perform other functionality of the embodiments, as described herein. Components of the computing device 310 may include, but are not limited to, a processing unit 320, a system memory 330, and a system bus 322 that couples various system components including the system memory 330 to the processing unit 320. The computer 310 may include or have access to a variety of computer readable media, for example for storing infrastructure data indices. The system memory 330 may include computer readable storage media in the form of volatile and/or nonvolatile memory such as read only memory (ROM) and/or random access memory (RAM). By way of example, and not limitation, system memory 330 may also include an operating system, application programs, other program modules, and program data.

A user can interface with (for example, enter commands and information) the computing device 310 through input devices. A monitor or other type of device can also be connected to the system bus 322 via an interface, such as an output interface 350. In addition to a monitor, computers may also include other peripheral output devices. The computing device 310 may operate in a networked or distributed environment using logical connections to one or more other remote computers or databases, e.g., autonomous mobile robot 10. The logical connections may include a network, such local area network (LAN) or a wide area network (WAN), but may also include other networks/buses.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device to produce a special purpose machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A pipe inspection robot, comprising:
a powered track system providing movement through a pipe to the pipe inspection robot;
a sensor component coupled to the powered track system;
a processor configured to operate the sensor component to collect pipe inspection data related to a pipe interior; and
a jetter coupled to one or more of the powered track system and the sensor component, the jetter comprising:
a nozzle;
a water pump;
an outflow part coupling the water pump to the nozzle;
an intake hose that couples the water pump to a local water source proximate to the powered track system;
wherein the water pump pressurizes water from the intake hose and provides pressurized water to the outflow part.

2. The pipe inspection robot of claim 1, wherein the local water source proximate to the powered track system comprises water within the pipe.

3. The pipe inspection robot of claim 1, wherein the fetter comprises a filter coupled to the intake hose.

4. The pipe inspection robot of claim 3, wherein the filter comprises a cagetype filter.

5. The pipe inspection robot of claim 1, wherein the nozzle comprises a penetrating nozzle.

6. The pipe inspection robot of claim 1, wherein the nozzle comprises a closed nozzle.

7. The pipe inspection robot of claim 1, wherein the nozzle comprises an array of nozzles.

8. The pipe inspection robot of claim 1, wherein the nozzle comprises a repositionable nozzle.

9. The pipe inspection robot of claim 1, wherein the nozzle comprises a repositionable nozzle that repositions in response to image analysis conducted by the processor.

10. The pipe inspection robot of claim 1, wherein the pipe inspection robot is an autonomous mobile robot that operates in an untethered mode.

11. A pipe inspection robot, comprising:
a chassis including tracks;
a sensor component that couples to the chassis;
a jetter that couples to one or more of the sensor component and the chassis, the jetter comprising:
a nozzle;
a water pump;
an outflow part extending toward a front of the pipe inspection robot, along an axis aligned with the tracks, and coupling the water pump to the nozzle; and
an intake hose attached to a manifold of the water pump, the intake hose extending along an outside margin of the chassis and at least to a bottom of the tracks to a position for suctioning water up from a pipe;

wherein the pump pressurizes water from the intake hose and provides pressurized water to the outflow part.

12. The pipe inspection robot of claim 11, wherein the jetter is stacked on top of the sensor component.

13. The pipe inspection robot of claim 11, wherein the sensor component is stacked on top of the jetter.

* * * * *